(12) United States Patent
Sakabe

(10) Patent No.: US 10,277,599 B2
(45) Date of Patent: Apr. 30, 2019

(54) NETWORK EQUIPMENT AND NON-TRANSITORY COMPUTER READABLE STORAGE MEDIUM

(71) Applicant: KYOCERA Document Solutions Inc., Osaka (JP)

(72) Inventor: Keiji Sakabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 300 days.

(21) Appl. No.: 15/253,552

(22) Filed: Aug. 31, 2016

(65) Prior Publication Data

US 2017/0063860 A1 Mar. 2, 2017

(30) Foreign Application Priority Data

Aug. 31, 2015 (JP) .................................. 2015-170929

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04N 1/44* | (2006.01) |

(52) U.S. Cl.
CPC ............ *H04L 63/10* (2013.01); *H04L 63/083* (2013.01); *H04N 1/4413* (2013.01); *H04N 2201/0041* (2013.01); *H04N 2201/0094* (2013.01)

(58) Field of Classification Search
CPC ... H04N 2201/0041; H04N 2201/0094; H04N 1/4413; H04L 63/10; H04L 63/083; G06F 3/1238

See application file for complete search history.

(56) References Cited

U.S. PATENT DOCUMENTS

| | | | |
|---|---|---|---|
| 2014/0118776 A1* | 5/2014 | Lee ........................ | G06F 3/1204 358/1.15 |
| 2016/0299725 A1* | 10/2016 | Hosoda .................. | H04W 12/08 |

FOREIGN PATENT DOCUMENTS

JP 2014-179926 A 9/2014

* cited by examiner

*Primary Examiner* — Trong H Nguyen
(74) *Attorney, Agent, or Firm* — Hawaii Patent Services; Nathaniel K. Fedde; Kenton N. Fedde

(57) ABSTRACT

Provided is a network equipment that improves convenience of access from a portable terminal and security via a P2P connection. The network equipment includes a network control part, a user authentication part and a system control part. The network control part controls direct communication with the portable terminal. The user authentication part manages user identification information and user information by associating with each other. The system control part manages the administrator user with an automatic connection turned on and the guest user with the automatic connection turned off. IF an automatic connection is turned on, the system control part allows the direct communication. The system control part receives the user information from the portable terminal and causes the user authentication part to perform user authentication if the automatic connection is turned off, and allows the direct communication if the user authentication succeeded.

4 Claims, 3 Drawing Sheets

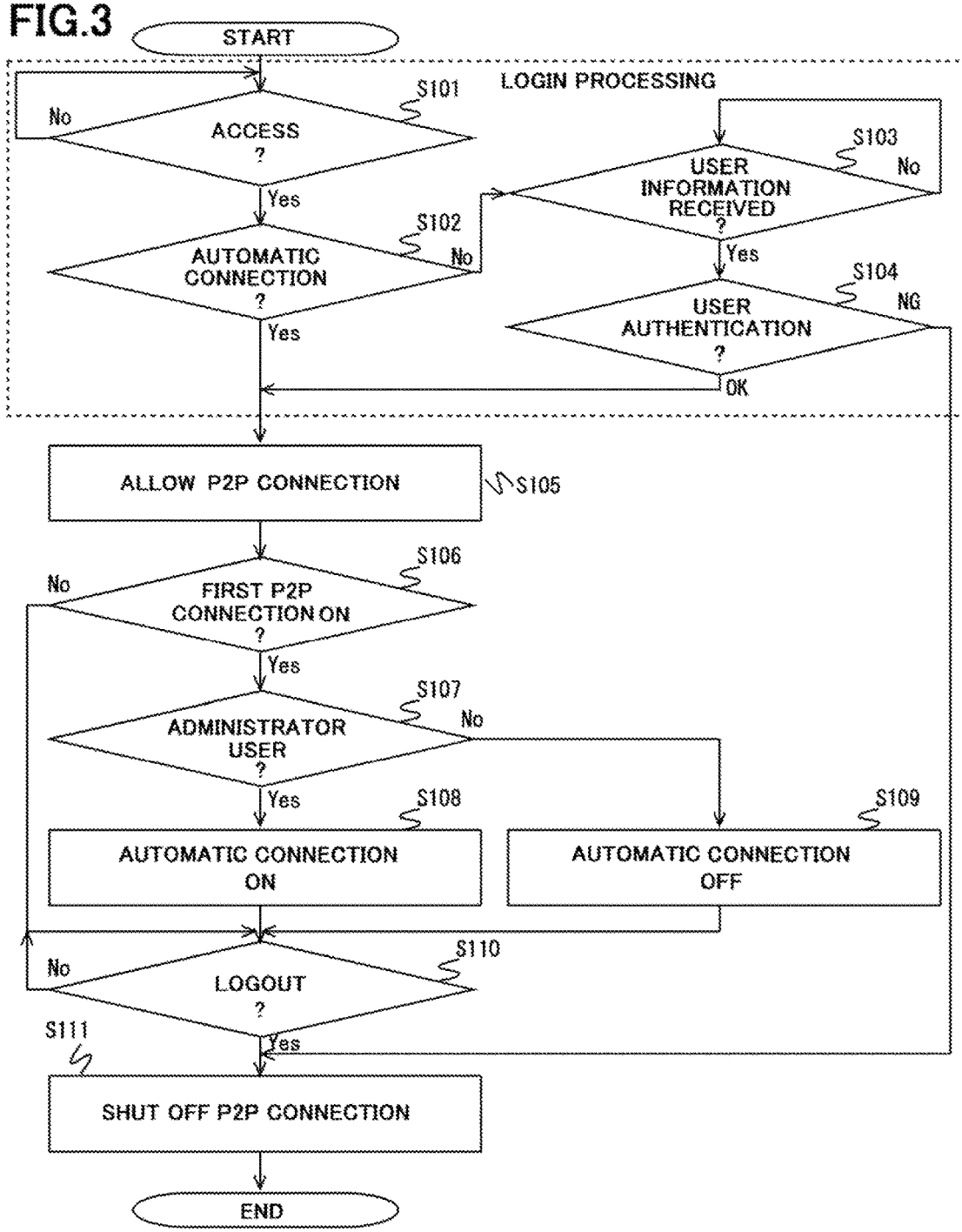

NETWORK EQUIPMENT AND NON-TRANSITORY COMPUTER READABLE STORAGE MEDIUM

INCORPORATION BY REFERENCE

This application is based on and claims the benefit of priority from Japanese Patent Application No. 2015-170929 filed on Aug. 31, 2015, the contents of which are hereby incorporated by reference.

BACKGROUND

The present disclosure relates to a network equipment that is connected to a wired LAN network and a wireless LAN network.

In a typical image forming apparatus such as MFP (Multifunction Peripheral) including a multifunction printer and a multifunction machine, it is configured to be able to connect to a user terminal such as a PC (Personal Computer) and to a portable terminal such as a smartphone via a wired LAN (Local Area Network) network and a wireless LAN network.

Further, some of models of the typical image forming apparatus are designed to be able to perform wireless communication of data reception such as print data and instruction data reception such as a printing instruction via a P2P (Peer to peer) connection with a portable terminal not via an access point. Note that a Wi-Fi direct (registered trademark) is generally used as the P2P connection.

As an image forming apparatus compatible with such P2P connection, it has been proposed, as a typical technology, a technology which is capable of automatically switching, at a timing according to an operation state of the image forming apparatus per se between a wireless communication via a P2P connection or a wireless communication via an access point.

Namely, a communication device (printing device) controls communication with an external device, in communication mode either of a first wireless communication mode (or wired communication mode) or a second wireless communication mode. When an operation state of the communication device (printing device) transits to an other state such as a power saving state, or the like, if a communication mode is set to the second wireless communication mode, the communication device (printing device) switches the communication mode to the first wireless communication mode (or wired communication mode).

SUMMARY

According to one aspect of the present disclosure, the present disclosure provides a network equipment including a memory that stores a control program and a processor that executes the control program. When the processor executes the control program, the processor operates to control direct communication with a portable terminal to be performed not via a wired LAN network and a wireless LAN network. When the processor executes the control program, the processor operates to manage user identification information indicating whether a user is an administrator user or a guest user and user information containing a user ID and a password by associating the user identification information with the user information, perform user authentication by receiving the user information at the time of login of the direct communication. When the processor executes the control program, the processor operates to manage the administrator user with an automatic connection turned on and the guest user with the automatic connection turned off. When the processor executes the control program, the processor operates to allow the direct communication with the portable terminal if the automatic connection is turned on to access for requesting the direct communication. When the processor executes the control program, the processor operates to perform user authentication by receiving the user information from the portable terminal if the automatic connection is turned off to the access for requesting the direct communication, and allow the direct communication with the portable terminal if the user authentication succeeded.

According to another aspect of the present disclosure, the present disclosure provides a non-transitory computer readable storage medium storing a control program executable by a computer of a network equipment. The control program causes the computer to control direct communication with a portable terminal to be performed not via a wired LAN network and a wireless LAN network. The control program causes the computer to manage user identification information indicating whether a user is an administrator user or a gust user and user information containing a user ID and a password by associating the user identification information with the user information, perform user authentication by receiving the user information at the time of login of the direct communication. The control program causes the computer to manage the administrator user with an automatic connection turned on and the guest user with the automatic connection turned off. The control program causes the computer to allow the direct communication with the portable terminal if the automatic connection is turned on to access for requesting the direct communication. The control program causes the computer to perform user authentication by receiving the user information from the portable terminal if the automatic connection is turned off to the access for requesting the direct communication, and allow the direct communication with the portable terminal if the user authentication succeeded.

BRIEF DESCRIPTION OF THE DRAWINGS

FIG. 3 shows steps of the P2P connection control at the MFP side shown in FIG. 2.

DETAILED DESCRIPTION

Figure 1:
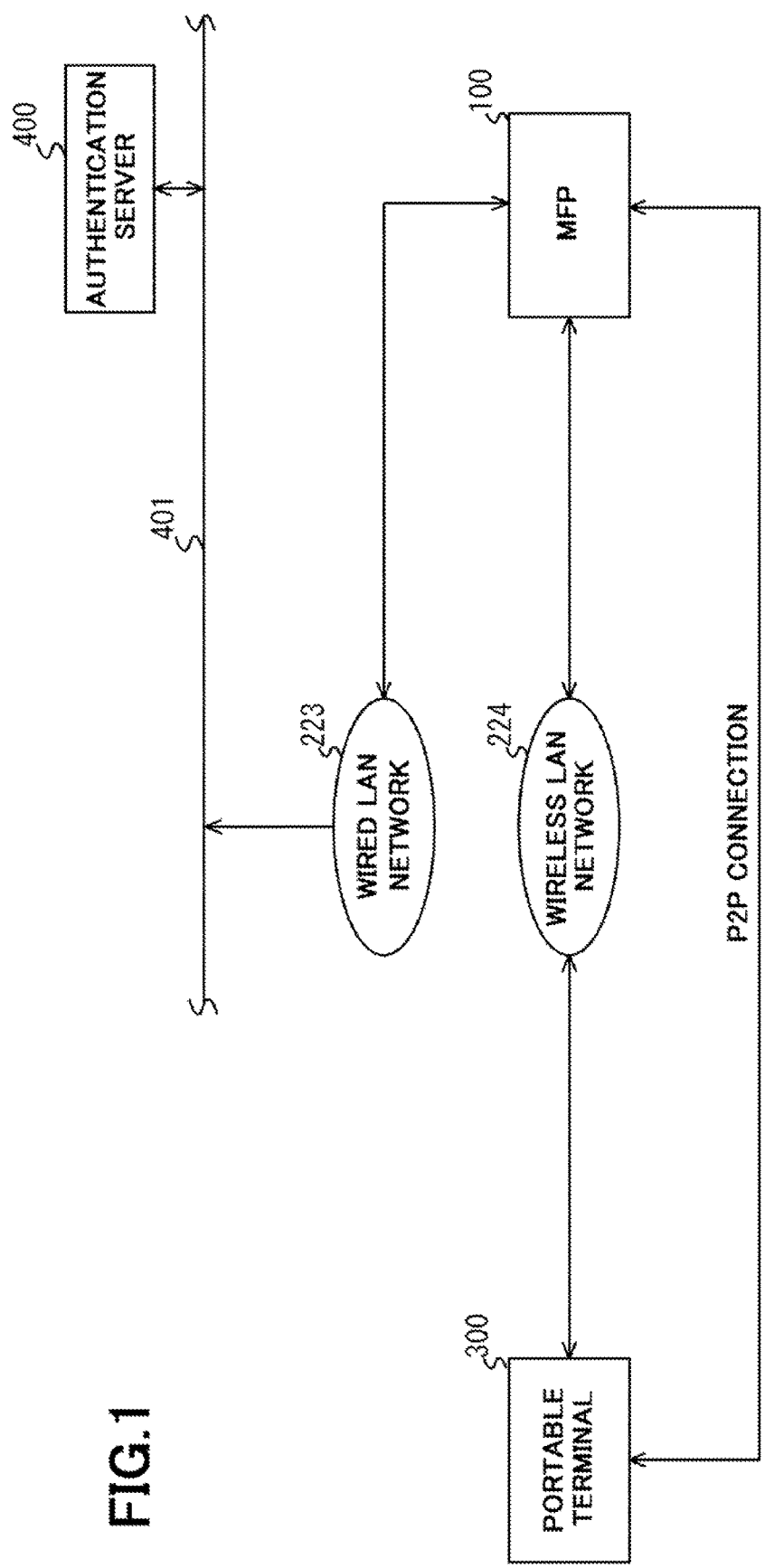
FIG. 1 shows an overview of a connection mode to a MFP according to one embodiment in a case where a network equipment of the present disclosure if applied to the MFP.
Figure 2:
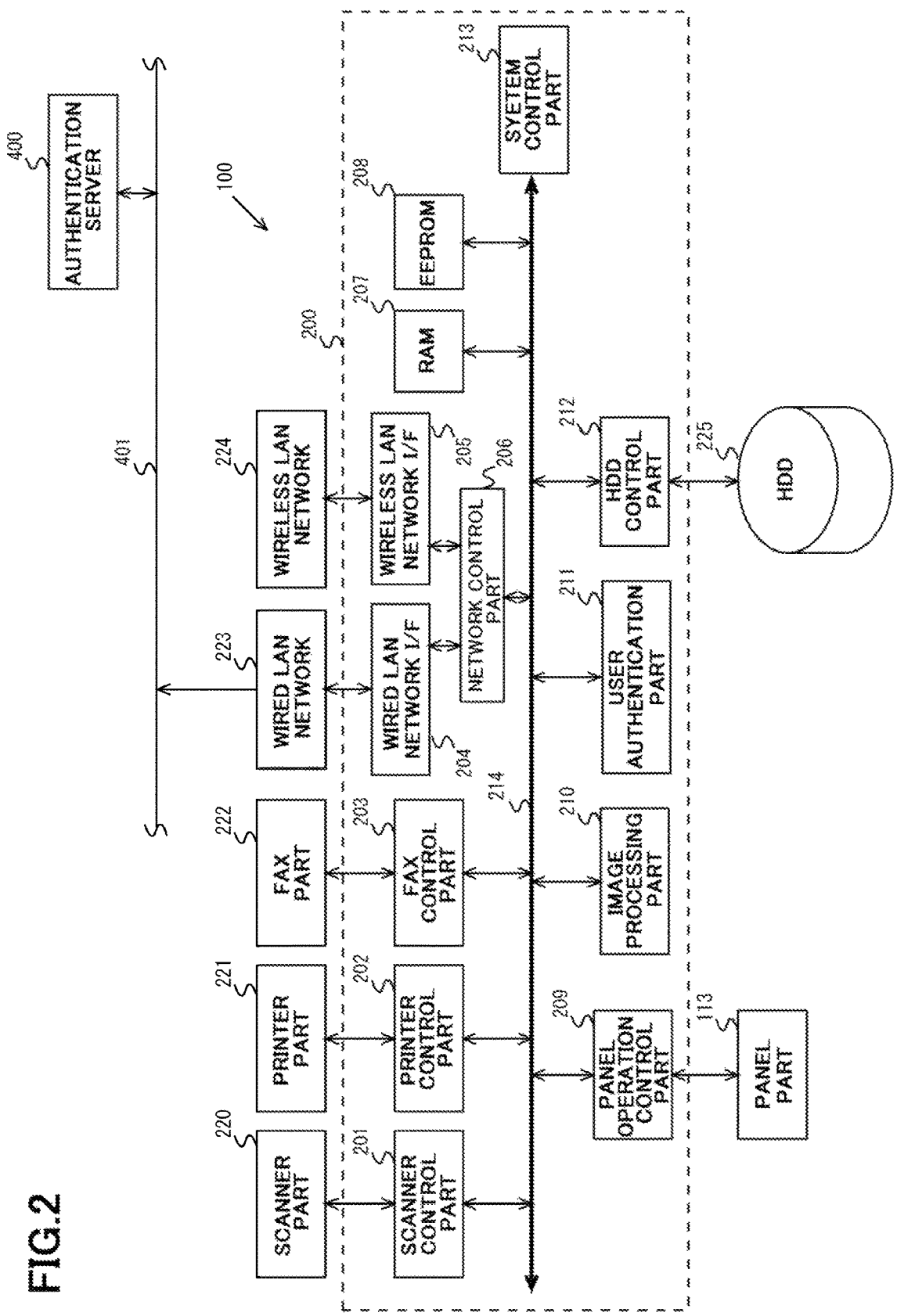
FIG. 2 shows an internal configuration of the MFP shown in FIG. 1.

Hereinafter, a detailed description will be given to one embodiment of a network equipment of the present disclosure with reference to FIGS. 1-3. As one example of the network equipment in the following description, it is assumed to be a MFP (Multifunction Peripheral) that is a complex peripheral equipment in which, for example, a printing function, a copying function, a FAX function, a data transmitting and receiving function via a network, a wireless communication function that is able to make a P2P (peer to peer) connection with a portable terminal not via an access point, or the like, and a user box function are installed. Note that a Wi-Fi Direct (registered trademark) is commonly used as the P2P connection.

A description will be given first to an overview of a connection mode to the MFP with reference to FIG. 1. The MFP 100 is configured to be able to connect to a user terminal such as a PC (Personal Computer) via a wired LAN (Local Area Network) network 223. Further, the MFP 100 is configured to be able to connect to an authentication server 400 via the wired LAN network 223 and a network 401. Furthermore, the MFP 100 is configured to be able to connect to a portable terminal 300 such as a smartphone via a wireless LAN network 224. Moreover, the MFP 100 is configured to be able to connect to the portable terminal 300 such as a smartphone via the P2P connection. In this connection, the authentication server 400 determines whether or not a user is an authorized user to be logged in via the network 401.

Next, a description will be given to one example of an internal configuration of the MFP 100 with reference to FIG. 2. The MFP 10 includes a control part 200, a scanner part 220, a printer part 221, a FAX part 222, a panel part 113, and a HDD 225.

The scanner part 220 is a device that converts an image signal of a document to be read by an image sensor into digital image data, and inputs to the control part 200.

The printer part 221 is a device that prints an image on a paper based on the image data output from the control part 200. The FAX part 222 is a device that transmits the image data output from the control part 200 to a destination facsimile via a telephone line, and receives the image data from the destination facsimile to input to the control part 200.

The panel part 113 is a device that performs selection from one of a printing function, a copying function, a FAX function, a data transmitting and receiving function via a network, a wireless communication function that is able to make a P2P connection with a portable terminal, and a user box function, and displays for various settings.

The HDD 225 is a storage device that stores an application program to provide various functions of the MFP 100. The HDD 225 has a plurality of partitions. The plurality of partitions is divided into partitions for an OS (Operating System) image, an installed application program, image data handling, and a user box that stores a user file.

The control part 200 is a processor that controls the whole operation of the MFP 100 by executing an image forming program and the other control program. The control part 200 includes a scanner control part 201, a printer control part 202, a FAX (Facsimile) control part 203, a wired LAN network I/F (interface) 204, a wireless LAN network I/F (interface) 205, a network control part 206, a RAM (Random Access Memory) 207, an EEPROM (Electrically Erasable Programmable Read-Only Memory) 208, a panel operation control part 209, an image processing part 210, a user authentication part 211, a HDD control part 212, and a system control part 213. These parts are connected to a data bus 214.

The scanner control part 201 controls a reading operation of the scanner part 220. The printer part 202 controls a printing operation of the printer part 221. The FAX control part 203 controls a transmitting and receiving operation of image data by the FAX part 222.

The network control part 206 performs transmission and reception control of data via the wired LAN network 223 and the wireless LAN network 224 through the wired LAN network I/F 204 and the wireless LAN network I/F 205. Note that the wireless LAN network 224 is formed via a Wi-Fi(registered trademark) rooter that is an access point. Further, the network control part 206 controls wireless communication by a P2P connection with a portable terminal. In the P2P connection, the network control part 206 forms a wireless network with the portable terminal 300, not via the Wi-Fi(registered trademark) rooter, with the own device (MFP 100) as an access point, through the wireless LAN network I/F 205. Further, the network control part 206 manages an access point of the Wi-Fi (registered trademark) rooter. Furthermore, the network control part 206 performs a setting and change of a name of the access point following an instruction by a user.

The RAM 207 is a work memory to execute a program. A control program to perform an operation check of each part is stored in the EEPROM 208. Also, log information about an operation executed by an application program is stored in the EEPROM 208. The panel operation control part 209 controls a display operation of the panel part 113. The image processing part 210 performs image processing (rasterization) to the image data.

The user authentication part 211 manages user identification information indicating whether a user is an administrator user being previously stored or a guest user, and user information containing a user ID (identification) and a password by associating the user identification information with the user information. When receiving an instruction for a setting and change from the panel part 113, the user authentication part 211 receives the user information containing the user ID and the password, and performs user authentication (local authentication). Further, when access for requesting a P2P connection is received from a portable terminal, the user authentication part 211 receives the user information containing the user ID and the password at the time, and performs user authentication (local authentication). In this connection, the user authentication part 211 authenticates access via the network 401 using the user information authenticated by the authentication server 400. The HDD control part 212 controls a reading and writing of data from and to the HDD 225.

The system control part 213 controls a cooperative operation of each part. Further, the system control part 213 performs control based on a selection of one of a printing function, a copying function, a FAX function, a data transmitting and receiving function via a network, and a user box function of the MFP 100 from a user through the panel part 113. Note that selection from one of the printing function, the copying function, the FAX function, the data transmitting and receiving function via the network, and the user box function of the MFP 100 can be made using a portable terminal.

Further, the system control part 213 manages every user whether or not access for requesting a P2P connection from the portable terminal is an automatic connection. Specifically, the system control part 213 manages user identification information which is managed by the user authentication part 211 and indicates whether a user is an administrator user or a guest user and connection information (for example, SSID (service set identifier)) held by the portable terminal of a user by associating the user identification information with the connection information. Note that the connection information is information automatically acquired and held at the portable terminal side when performing first access for requesting a P2P connection by the portable terminal. Therefore, when the access for requesting the P2P connection is received first from the portable terminal, the system control part 213 manages an administrator user with an automatic connection turned on (allowed) and a guest user with the automatic connection turned off (forbidden).

Then, the system control part 213 determines whether or not the access for requesting the P2P connection from the portable terminal is the automatic connection. If the access is the automatic connection, the system control part 213 receives the P2P connection from the portable terminal via the network control part 206. This allows an administrator user to perform the P2P connection by simplified login processing.

Further, if the system control part 213 determines that the access for requesting the P2P connection from the portable terminal is not the automatic connection, the system control part 213 receives user information containing a user ID and a password from the portable terminal, and causes the user authentication part 211 to perform user authentication. Then, if the user authentication succeeded, the system control part 213 receives the P2P connection from the portable terminal through the network control part 206. This leads to that a guest user performs login processing every access for requesting the P2P connection.

Alternatively, the user identification information indicating whether a user is the above-mentioned administrator user or the guest user and the user information containing a user ID and a password, which are managed by associating the user identification information with the user information by the user authentication part 211 may be managed at the system control part 213 side. Further, the user identification information, the user information and the connection information which is managed by the system control part 213 by associating the user identification information with the user information, and held by the above-mentioned portable terminal of a user are stored in the HDD 225, or the like.

Next, a description will be given to the P2P connection control at the MFP 100 side with reference to FIG. 3. In this connection, steps S101 to S104 indicate login processing in the procedure to be described below.

(Step S101)

First, the system control part 213 determines whether or not access for requesting a P2P connection is received from a portable terminal. In this case, the system control part 213 waits for notification that access for requesting the P2P connection is received from the portable terminal (step S201: No). Then, if the notification that access for requesting the P2P connection is received from the network control part 206, the system control part 213 determines that the access for requesting the P2P connection is received from the portable terminal (step S101: Yes).

(Step S102)

The system control part 213 determines whether or not an automatic connection is turned on based on connection information from the portable terminal which gained access thereto for requesting the P2P connection. Note that when the portable terminal gains access thereto first for requesting the P2P connection, the connection information is automatically acquired and stored at the portable terminal side. If the system control part 213 determines that an automatic connection is turned off (step S102: No), the system control part 213 proceeds to step S103. Otherwise, if the system control part 213 determines that the automatic connection is turned on (step S102: Yes), the system control part 213 proceeds to step S105.

(Step S103)

If the system control part 213 determines that the automatic connection is turned off, the system control part 213 waits until it receives user information containing a user ID and a password (step S103: No). Then, if the system control part 213 receives the user information (step S103: Yes), the system control part 213 proceeds to step S104.

(Step S104)

If the system control part 213 receives the user information, the system control part 213 causes the user authentication part 211 to perform user authentication. If the user authentication by the user authentication part 211 is failed (step S104: No), the system control part 213 proceeds to step S110. Otherwise, if the user authentication by the user authentication part 211 succeeded (step S104: OK), the system control part 213 proceeds to step S105.

(Step S105)

The system control part 213 allows a P2P connection with the portable terminal through the network control part 206.

(Step S106)

The system control part 213 determines whether or not the P2P connection with the portable terminal is firstly opened. In this case, if the user identification information which is managed by the user authentication part 211 and indicates whether a user is an administrator user or a guest user and the connection information held by the portable terminal of a user are not managed by associating the user identification information with the connection information, the system control part 213 determines that the P2P connection with the portable terminal is firstly opened (step S106: Yes), and proceeds to step S107. Otherwise, if the user identification information which is managed by the user authentication part 211 and indicates whether a user is the administrator user or the guest user, and the connection information held by the portable terminal of a user are managed by associating the user identification information with the connection information, the system control part 213 determines that the P2P connection is not firstly opened (step S106: No), and proceeds to step S110.

(Step S107)

The system control part 213 determines whether or not a user of the portable terminal that is an administrator user who allowed the P2P connection. In this case, the system control part 213 refers to the user information managed by the user authentication part 211, and determines whether or not a user is an administrator user based on the connection information from the portable terminal from which access for requesting a P2P connection is received. If the system control part 213 determines that the user is an administrator user (step S107: Yes), the system control part 213 proceeds to step S108. Otherwise, if the system control part 213 determines that the user is a guest user (step S107: NO), the system control part proceeds to step S109.

(Step S108)

If the system control part 213 determines that the user is an administrator user, the system control part 213 manages the administrator user with an automatic connection turned on (allowed).

(Step S109)

Otherwise, if the system control part 213 determines that the user is a guest user, the system control part 213 manages the guest user with the automatic connection turned off (forbidden).

(Step S110)

The system control part 213 determines that logout is performed. In this case, the system control part 213 waits for notification from the network control part 206 that a P2P connection is closed (step S110: No). If the system control part 213 receives the notification from the network control part 206 that the P2P connection is closed, the system control part 213 determines that the user is logged out (step D110: yes).

(Step S111)

The system control part 213 shuts down the P2P connection through the network control part 206.

Thus, in the present embodiment, the network control part 206 controls the P2P connection (direct communication) with portable terminal to be performed not via the wired LAN network 223 and the wireless LAN network 224. Then, the user authentication part 211 manages the user identification information indicating whether a user is an administrator user or a guest user and the user information containing a user ID and a password by associating the user identification information with the user information, receives user information at the time of login of the P2P connection (direct communication), and performs user authentication. Then, the system control part 213 manages an administrator user with an automatic connection turned on and a guest user with the automatic connection turned off. If the automatic connection is turned on to access for requesting the P2P connection (direct communication), the system control part 213 allows the direct communication with a portable terminal. Otherwise, if the automatic connection is turned off to access for requesting the direct communication, the system control part 213 receives user information from the portable terminal, causes the user authentication part 211 to perform user authentication. If the user authentication succeeded, the system control part 213 allows the direct communication with the portable terminal.

This enables an administrator user to perform the direct communication by simplified login processing, thereby improving convenience of access from the portable terminal. Meanwhile, a guest user is allowed to perform the direct communication after user authentication by receiving user information every login of the direct communication. For this reason, it becomes possible to gain access to the image forming apparatus from the portable terminal only if the direct communication is allowed, and prevents a situation where it is always accessible from the outside, thereby prevents at least leakage of confidential information. Accordingly, it improves security in the direct communication.

Further, in the present embodiment, the system control part 213 manages user identification information managed by the user authentication part 211 and connection information held by the portable terminal by associating the user identification information with the connection information. If system control part 213 determines that a P2P connection (direct communication) with a portable terminal is firstly opened, the system control part 213 manages an administrator user with an automatic connection turned on and a guest user with the automatic connection turned off. For this reason, in addition to the above-mentioned effect, the system control part 213 can automatically perform on/off control of the automatic connection to an administrator user and a guest user who experience the P2P connection (direct communication) for the first time.

The P2P connection between the image forming apparatus and the portable terminal enables access to the image forming apparatus as long as the P2P connection covers a reachable range of a radio wave. Since it is likely that various information containing confidential information may be held in the image forming apparatus, it needs to pay enough attention to information leakage. Also, if the settings of the image forming apparatus were to be freely rewritten without permission or a printing instruction for an unexpected large amount of printed matter were to be given, there would be a case where the image forming apparatus becomes temporally unavailable.

In this case, it is considered that many restrictions are imposed upon access to the image forming apparatus, but such measures bring about an increased procedure for access to the image forming apparatus, which deteriorates convenience of access via the P2P connection.

Given the situation, in an environment where the wired LAN network, the wireless LAN network and the P2P connection are simultaneously utilized, it has been longing for the development of a network equipment which enables improvement of convenience of access from the portable terminal and security via the P2P connection.

According to the network equipment and the function restrictions method of the present disclosure, the disclosure enables an administrator user to perform direct communication by simplified login processing, thereby improving convenience of access from the portable terminal. Further, since it becomes possible for a guest user to perform access from the portable terminal only if the direct communication is allowed, which prevents a situation where it is always accessible from the outside. This prevents at least leakage of confidential information, thereby improving security via the direct communication.

While in the present embodiment, a description is given to a case where the network equipment is applied to the MFP 100, not necessarily limited thereto, the present disclosure can be applied to an equipment which is able to do the wired LAN network 223, the wireless LAN network 224 and the P2P connection, and holds confidential information, or the like.

What is claimed is:

1. A network equipment comprising:
a memory that stores a control program; and
a processor that executes the control program,
wherein when the processor executes the control program, the processor operates to:
control direct communication with a portable terminal to be performed not via a wired LAN network and not via a wireless LAN network,
manage user identification information indicating whether a user is an administrator user or a guest user and user information containing a user ID and a password by associating the user identification information with the user information,
receive the user information at a time of a login performed to allow the direct communication,
manage the administrator user with an automatic connection turned on responsive to determining the user is the administrator user and the guest user with the automatic connection turned off responsive to determining the user is the guest user,
allow and establish the direct communication with the portable terminal responsive to determining the automatic connection is turned on to access for requesting the direct communication without accepting the user information and without performing user authentication,
perform user authentication by receiving the user information from the portable terminal responsive to determining the automatic connection is turned off to the access for requesting the direct communication, and
allow and establish the direct communication with the portable terminal responsive to determining the user authentication succeeded.

2. The network equipment according to claim 1, wherein when the processor executes the control program, the processor operates to:

manage the user identification information being managed and connection information held by the portable terminal by associating the user identification information with the connection information, and manage the administrator user with the automatic connection turned on and the guest user with the automatic connection turned off responsive to the processor determining that the direct communication with the portable terminal is firstly opened, wherein the processor determines that the direct communication with the portable terminal is firstly opened responsive to the processor determining that the user identification information has not been previously associated with the connection information.

3. A non-transitory computer readable storage medium storing a control program executable by a computer of a network equipment for causing the computer to execute:

controlling direct communication with a portable terminal to be performed not via a wired LAN network and not via a wireless LAN network, managing user identification information indicating whether a user is an administrator user or a guest user and user information containing a user ID and a password by associating the user identification information with the user information, performing user authentication by receiving the user information at a time of a login wherein the login is performed to allow the direct communication, managing the administrator user with an automatic connection turned on responsive to determining the user is the administrator user and the guest user with the automatic connection turned off responsive to determining the user is the guest user, allowing and establishing the direct communication with the portable terminal responsive to determining the automatic connection is turned on to access for requesting the direct communication without accepting the user information and without performing user authentication, performing user authentication by receiving the user information from the portable terminal responsive to determining the automatic connection is turned off to the access for requesting the direct communication, and allowing and establishing the direct communication with the portable terminal responsive to determining the user authentication succeeded.

4. The non-transitory computer readable storage medium according to claim 3, further causing the computer to execute:

managing the user identification information being managed and connection information held by the portable terminal by associating the user identification information with the connection information, and managing the administrator user with the automatic connection turned on responsive to determining that the direct communication with the portable terminal is firstly opened, and the guest user with the automatic connection turned off, wherein the computer determines that the direct communication with the portable terminal is firstly opened responsive to the computer determining that the user identification information has not been previously associated with the connection information.

* * * * *